(12) United States Patent
Toukoniitty et al.

(10) Patent No.: US 11,499,104 B2
(45) Date of Patent: *Nov. 15, 2022

(54) PURIFICATION OF RECYCLED AND RENEWABLE ORGANIC MATERIAL

(71) Applicant: Neste Oyj, Espoo (FI)

(72) Inventors: Blanka Toukoniitty, Porvoo (FI); Ville Paasikallio, Porvoo (FI); Jukka-Pekka Pasanen, Porvoo (FI); Jouni Touronen, Porvoo (FI); Meri Hovi, Porvoo (FI); Antti Pasanen, Porvoo (FI); Salla Likander, Porvoo (FI); Sami Toppinen, Porvoo (FI); Pekka Aalto, Porvoo (FI); Kari Jansson, Porvoo (FI); Marina Lindblad, Porvoo (FI); Mats Käldström, Porvoo (FI); Kaisa Lamminpää, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/261,679

(22) PCT Filed: Jul. 19, 2019

(86) PCT No.: PCT/EP2019/069503
§ 371 (c)(1),
(2) Date: Jan. 20, 2021

(87) PCT Pub. No.: WO2020/016410
PCT Pub. Date: Jan. 23, 2020

(65) Prior Publication Data
US 2022/0135891 A1    May 5, 2022

(30) Foreign Application Priority Data
Jul. 20, 2018   (FI) .................................... 20185654

(51) Int. Cl.
*C10G 69/06*   (2006.01)
*C10G 1/00*   (2006.01)
(Continued)

(52) U.S. Cl.
CPC ............. *C10G 69/06* (2013.01); *C10G 1/002* (2013.01); *C10G 3/40* (2013.01); *C10G 3/50* (2013.01);
(Continued)

(58) Field of Classification Search
None
See application file for complete search history.

(56) References Cited

U.S. PATENT DOCUMENTS 2,524,088 A * 10/1950 Shaw ....................... C10K 1/16
423/242.4
4,097,369 A    6/1978 Ebel et al.
(Continued)

FOREIGN PATENT DOCUMENTS

CA        894222 A     2/1972
CN      102786986 A    11/2012
(Continued)

OTHER PUBLICATIONS

Energy Fossil, Recovery of Navy Distillate Fuel from Reclaimed Product, Dennis W. Brinkman & Marwin L. Whisman (Published Nov. 1984).
(Continued)

*Primary Examiner* — Tam M Nguyen
(74) *Attorney, Agent, or Firm* — Buchanan Ingersoll & Rooney PC

(57) ABSTRACT

A method is disclosed of purifying a recycled or renewable organic material, wherein the recycled or renewable organic material includes more than 1 ppm silicon as silicon compounds and/or more than 10 ppm phosphorous as phospho-
(Continued)

rous compounds. The method can include providing a feed of the lipid material; heat treating the organic material in presence of an adsorbent and the filtering organic material and hydrotreating the lipid material in a presence of a hydrotreating catalyst to obtain purified hydrotreated organic material having less than 20% organic material and/or less than 30% of the original phosphorous content of the organic material.

36 Claims, 3 Drawing Sheets

(51) Int. Cl.
　　C10G 3/00　　　(2006.01)
　　C10G 9/36　　　(2006.01)
　　C10G 11/18　　　(2006.01)
　　C10G 45/58　　　(2006.01)
　　C10G 47/00　　　(2006.01)
(52) U.S. Cl.
　　CPC ............. C10G 9/36 (2013.01); C10G 11/18 (2013.01); C10G 45/58 (2013.01); C10G 47/00 (2013.01); C10G 2300/1007 (2013.01); C10G 2300/1018 (2013.01); C10G 2300/202 (2013.01)

(56) References Cited

U.S. PATENT DOCUMENTS

| | | | |
|---|---|---|---|
| 4,151,072 A | 4/1979 | Johnson et al. |
| 4,160,725 A | 7/1979 | Josis et al. |
| 4,241,227 A | 12/1980 | Stonner et al. |
| 4,252,637 A | 2/1981 | Knorre et al. |
| 4,328,128 A | 5/1982 | Stanulonis et al. |
| 5,049,258 A | 9/1991 | Keim et al. |
| 5,449,797 A | 9/1995 | Estes et al. |
| 5,514,632 A | 5/1996 | Chester et al. |
| 6,072,065 A | 6/2000 | Chavet |
| 6,586,638 B1 | 7/2003 | Zhang et al. |
| 9,347,178 B2 | 5/2016 | Powell et al. |
| 9,353,478 B2 | 5/2016 | Powell et al. |
| 9,382,483 B2 | 7/2016 | Knuuttila et al. |
| 9,399,836 B2 | 7/2016 | Powell et al. |
| 9,593,448 B2 | 3/2017 | Powell et al. |
| 9,663,720 B2 | 5/2017 | Nousiainen et al. |
| 9,688,919 B2 | 6/2017 | Vilonen et al. |
| 9,932,530 B2 | 4/2018 | Garg et al. |
| 10,023,810 B2 | 7/2018 | Nousiainen et al. |
| 10,815,428 B2 | 10/2020 | Nousiainen et al. |
| 2005/0101761 A1 | 5/2005 | Lambert et al. |
| 2005/0240065 A1 | 10/2005 | Blaschke et al. |
| 2006/0167291 A1 | 7/2006 | Te et al. |
| 2007/0170091 A1 | 7/2007 | Monnier et al. |
| 2008/0314799 A1 | 12/2008 | Li et al. |
| 2009/0229172 A1 | 9/2009 | Brady et al. |
| 2009/0250376 A1 | 10/2009 | Brandvoid et al. |
| 2011/0138680 A1 | 6/2011 | Dandeu et al. |
| 2012/0088943 A1 | 4/2012 | Knuuttila et al. |
| 2012/0116134 A1 | 5/2012 | Bozzano et al. |
| 2013/0072730 A1 | 3/2013 | Knuuttila et al. |
| 2013/0090502 A1 | 4/2013 | Laakkonen et al. |
| 2013/0158329 A1 | 6/2013 | Brandvold |
| 2013/0305598 A1 | 11/2013 | Hamilton et al. |
| 2013/0345487 A1 | 12/2013 | Baird et al. |
| 2014/0005451 A1 | 1/2014 | Mezza et al. |
| 2014/0275666 A1 | 9/2014 | Bauer et al. |
| 2015/0052807 A1 | 2/2015 | Nousiainen et al. |
| 2015/0059354 A1 | 3/2015 | Gutierrez et al. |
| 2015/0251168 A1 | 9/2015 | Kettunen et al. |
| 2015/0361356 A1 | 12/2015 | Garg et al. |
| 2016/0060540 A1 | 3/2016 | Ouni et al. |
| 2016/0130509 A1 | 5/2016 | Nousiainen et al. |
| 2016/0177188 A1 | 6/2016 | Vilonen et al. |
| 2016/0177201 A1 | 6/2016 | Pandranki et al. |
| 2016/0186067 A1 | 6/2016 | Powell et al. |
| 2016/0257888 A1 | 9/2016 | Nousiainen et al. |
| 2016/0289576 A1 | 10/2016 | Eilos |
| 2017/0145318 A1 | 5/2017 | Myllyoja et al. |
| 2017/0158967 A1 | 6/2017 | Reiner et al. |
| 2019/0203154 A1 | 7/2019 | Malm |
| 2020/0308505 A1 | 10/2020 | Dayton et al. |
| 2021/0269722 A1* | 9/2021 | Touronen .................. C10G 1/06 |
| 2021/0277324 A1* | 9/2021 | Toukoniitty .............. C11B 3/10 |
| 2021/0284925 A1* | 9/2021 | Gao ......................... C12M 21/04 |
| 2021/0292653 A1 | 9/2021 | Touronen et al. |
| 2021/0292656 A1 | 9/2021 | Touronen et al. |
| 2021/0292657 A1* | 9/2021 | Toukoniitty ............. C10G 9/36 |
| 2021/0301210 A1* | 9/2021 | Timken ................... C10G 1/002 |
| 2021/0332300 A1* | 10/2021 | Timken ................... C10G 31/09 |

FOREIGN PATENT DOCUMENTS

| | | |
|---|---|---|
| CN | 106552611 A | 4/2017 |
| CN | 107636124 A | 1/2018 |
| CN | 107892990 A | 4/2018 |
| CN | 107974265 A | 5/2018 |
| CN | 107974266 A | 5/2018 |
| CN | 108251156 A | 7/2018 |
| EP | 0072873 A1 | 3/1983 |
| EP | 0420651 A1 | 4/1991 |
| EP | 0420652 A1 | 4/1991 |
| EP | 0574272 A2 | 12/1993 |
| EP | 1396531 A2 | 3/2004 |
| EP | 2149593 A1 | 2/2010 |
| EP | 2930231 A1 | 10/2015 |
| FI | 20135638 A | 12/2014 |
| JP | S5431484 B2 | 10/1979 |
| JP | H0940970 A | 2/1997 |
| JP | H1161148 A | 3/1999 |
| JP | 2000169862 A | 6/2000 |
| JP | 2003034794 A | 2/2003 |
| JP | 2003253038 A | 9/2003 |
| JP | 2007224196 A | 9/2007 |
| JP | 2009155475 A | 7/2009 |
| JP | 2010509472 A | 3/2010 |
| JP | 2011515539 A | 5/2011 |
| JP | 2013544304 A | 12/2013 |
| SE | 352373 B | 12/1972 |
| WO | 2008058664 A1 | 5/2008 |
| WO | 2012069467 A1 | 5/2012 |
| WO | 2013089838 A1 | 6/2013 |
| WO | 2013156683 A1 | 10/2013 |
| WO | 2014001632 A1 | 1/2014 |
| WO | 2015087938 A1 | 6/2015 |
| WO | 2015101713 A1 | 7/2015 |
| WO | 2016053948 A1 | 4/2016 |
| WO | 2018024728 A1 | 2/2018 |
| WO | 2018025103 A1 | 2/2018 |
| WO | 2018025104 A1 | 2/2018 |
| WO | 2018058172 A1 | 4/2018 |
| WO | 2018127812 A1 | 7/2018 |

OTHER PUBLICATIONS

Fats and Oils: Formulating and Processing for Applications, Third Edition By Richard D. O'Brien (2009).
Finnish Office Action dated Apr. 23, 2019 for Application No. 2185650.
International Preliminary Report on Patentability issued in corresponding International Patent Application No. PCT/EP2019/069474 dated Dec. 15, 2020.
International Preliminary Report on Patentability issued in corresponding International Patent Application No. PCT/EP2019/069482 dated Jan. 21, 2021.
International Preliminary Report on Patentability issued in corresponding International Patent Application No. PCT/EP2019/069490 dated Jul. 15, 2020.
International Preliminary Report on Patentability issued in corresponding International Patent Application No. PCT/EP2019/069497 dated Oct. 9, 2020.

(56) References Cited

OTHER PUBLICATIONS

International Preliminary Report on Patentability issued in corresponding International Patent Application No. PCT/EP2019/069503 dated Dec. 16, 2020.
International Preliminary Report on Patentability issued in corresponding International Patent Application No. PCT/EP2019/069512 dated Sep. 29, 2020.
International Search Report (PCT/ISA/210) and Written Opinion (PCT/ISA/237) dated Dec. 19, 2019, by the European Patent Office as the International Searching Authority for International Application No. PCT/EP2019/069503.
International Search Report (PCT/ISA/210) and Written Opinion (PCT/ISA/237) dated Dec. 5, 2019, by the European Patent Office as the International Searching Authority for International Application No. PCT/EP2019/069474.
International Search Report (PCT/ISA/210) and Written Opinion (PCT/ISA/237) dated Dec. 11, 2019, by the European Patent Office as the International Search Authority for International Patent Application No. PCT/EP2019/069482.
International Search Report (PCT/ISA/210) and Written Opinion (PCT/ISA/237) dated Sep. 10, 2019, by the European Patent Office as the International Searching Authority for International Application No. PCT/EP2019/069497.
International Search Report (PCT/ISA/210) and Written Opinion (PCT/ISA/237) dated Sep. 10, 2019, by the European Patent Office as the International Searching Authority for International Application No. PCT/EP2019/069512.
International Search Report (PCT/ISA/210) with translation and Written Opinion (PCT/ISA/237) dated Dec. 11, 2019, by the European Patent Office as the International Searching Authority for International Application No. PCT/EP2019/069490.
Punkkinen Henna et al., Research Report: "Thermal conversion of plastic-containing waste: A Review" (2017).
Search Report dated Apr. 9, 2019 by the Finnish Patent and Registration Office for Application No. 20185651.
Search Report dated Nov. 12, 2018 by the Finnish Patent and Registration Office for Application No. 20185651.
Search Report dated Nov. 19, 2018 by the Finnish Patent and Registration Office for Application No. 20185653.
Search Report dated Nov. 20, 2018 by the Finnish Patent and Registration Office for Application No. 20185654.
Search Report dated Nov. 21, 2018 by the Finnish Patent and Registration Office for Application No. 20185655.
Search Report dated Nov. 21, 2018 by the Finnish Patent and Registration Office for Application No. 2185650.
Search Report dated Nov. 6, 2018 by the Finnish Patent and Registration Office for Application No. 20185652.
Mohd Zin, Rohani Binti, et al., "Process Design in Degumming and Bleaching of Palm Oil", Centre of Lipids Engineering and Applied Research (CLEAR), Universiti Teknologi Malaysia, Nov. 2006, 239 pages.
Pyl, Steven P., et al., "Wood-derived olefins by steam cracking of hydrodeoxygenated tall oils", Bioresource Technology 126, 2012, pp. 48-55, Elsevier Ltd.
Sigot, L., et al., "Adsorption of octamethylcyclotetrasiloxane on silica gel for biogas purification", Fuel, Jul. 8, 2014, vol. 135, pp. 205-209.
Vogt, E.T.C., et al., "Fluid catalytic cracking: recent developments on the grand old lady of zeolite catalysis", Chern. Soc. Rev., Sep. 18, 2015, pp. 7342-7370, The Royal Society of Chemistry.
Office Action (Communication) dated Mar. 30, 2022, by the European Patent Office in corresponding European Patent Application No. 19742575.4. (8 pages).
Office Action (Opposition) dated Dec. 15, 2021, by the Finnish Patent Office in corresponding Finnish Patent Application No. FI 128911. (34pages).
Office Action dated Mar. 17, 2022, by the U.S. Patent Office in corresponding U.S. Appl. No. 17/261,679.
First Office Action dated Feb. 15, 2022, by the Chinese Patent Office in corresponding Chinese Patent Application No. 2019800484072, and an English Translation of the Office Action. (18 pages).
First Office Action dated Feb. 15, 2022, issued in the corresponding Chinese Patent Application No. 2019800477596, 15 pages including 6 pages of English Translation.
Search Report dated Mar. 24, 2022,issued in the corresponding Chinese Patent Application No. 2019800538354, 3 pages of official copy without English Translation.
Office Action dated Mar. 1, 2022, issued in the corresponding Japanese Patent Application No. 2021-502416, 4 pages including 2 pages of English Translation.
Office Action dated Mar. 1, 2022, issued in the corresponding Japanese Patent Application No. 2021-502417, 10 pages including 6 pages of English Translation.
Office Action dated Mar. 1, 2022, issued in the corresponding Japanese Patent Application No. 2021-502426, 5 pages including 3 pages of English Translation.
Office Action dated Mar. 8, 2022, issued in the corresponding Japanese Patent Application No. 2021-502928, 8 pages including 5 pages of English Translation.

\* cited by examiner

PURIFICATION OF RECYCLED AND RENEWABLE ORGANIC MATERIAL

FIELD OF THE INVENTION

The present invention relates to a method of purifying recycled or renewable organic material, in particular recycled or renewable organic material comprising 1 ppm silicon as silicon compounds and/or more than 10 ppm phosphorous as phosphorous compounds.

BACKGROUND OF THE INVENTION

In some cases recycled or renewable organic material contains high amounts of silicon (Si) as silicon compounds and high amounts of phosphorous as phosphorous compounds such as phospholipids. Before catalytic processing of the recycled or renewable organic material these impurities need to be removed from the material as these compounds are known catalyst poisons and should therefore be removed prior to hydrotreating to maximize the cycle length and profits of the hydrotreater.

In particular tall oil pitch (TOP) contains silicon and phosphorous impurities, most likely originating from anti-fouling agents used in upstream processing. Anti-fouling agents comprise e.g. polydimethylsiloxanes (PDMS), which are soluble in oil and are therefore difficult to remove from oil. Also, some other impurities can come from sand or dirt during wood collection. Removal of silicon impurities prior to hydrotreatment is required to avoid decreased lifetime of the catalyst in the unit. Conventional purification methods such as filtration or bleaching are not adequate to remove the silicon impurities effectively.

BRIEF DESCRIPTION OF THE INVENTION

An object of the present invention is thus to provide a method so as to overcome the above problems. The objects of the invention are achieved by a method which is characterized by what is stated in the independent claims. The preferred embodiments of the invention are disclosed in the dependent claims.

The invention is based on the surprizing realization recycled or renewable organic material containing high amounts of phosphorous and silicon compounds may be purified by a method that leads to removal of phosphorous and silicon compounds from the recycled or renewable organic material as the recycled or renewable organic material is subjected to heat treating the feed of lipid material in the presence of an adsorbent at 180 to 325° C. and filtering the material and hydrotreating the lipid material in a presence of a hydrotreating catalyst at a temperature from 270 to 380° C. under pressure from 4 to 20 MPa and under continuous hydrogen flow.

The method allows use of low quality recycled or renewable organic material feeds as a feedstock in hydrotreating, e.g. in processes producing high quality renewable fuels and/or chemicals.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
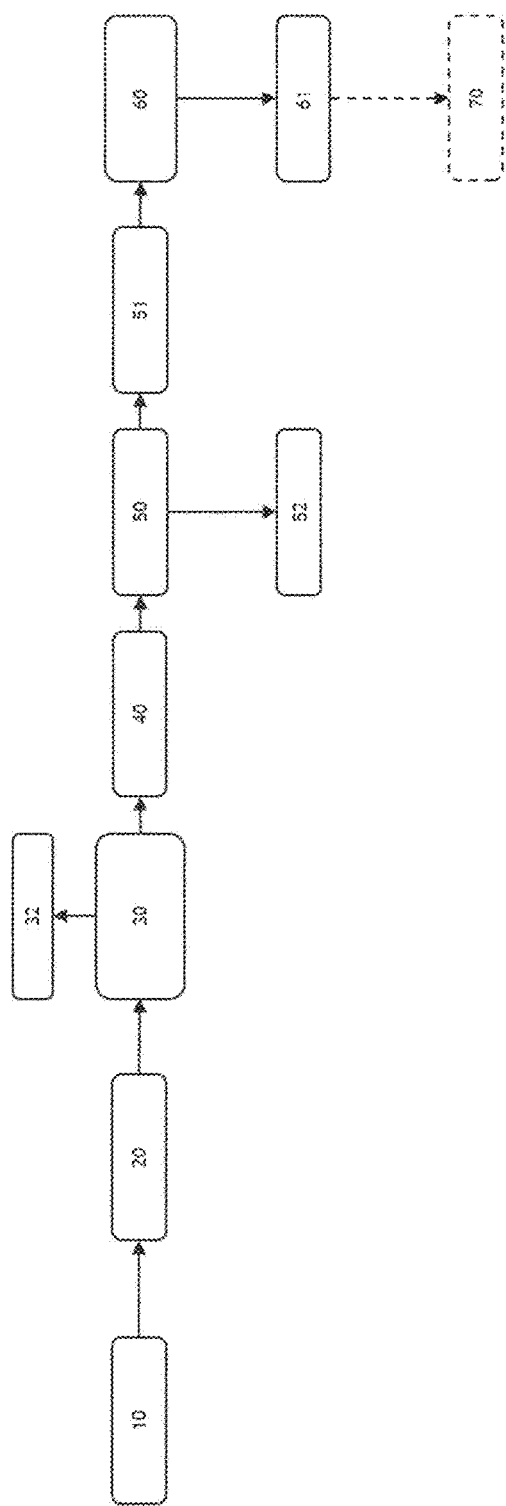
FIG. 1 illustrates a first exemplary process flow of the present method.

The present invention provides a method of purifying a recycled or renewable organic material.

The term "recycled or renewable organic material" refers to organic material, i.e. material containing carbon, obtained 1) from a natural resource which replenishes to overcome recourse depletion caused by its usage and consumption or 2) from a raw or processed material that is recovered from a waste for reuse. The recycled or renewable organic material characteristically comprises aliphatic compounds having a carbon chain of from 4 to 30 carbon atoms, particularly from 12 to 22 carbon atoms. Typical examples of such aliphatic compounds are fatty acids or esters thereof, in particular wherein the fatty acids have an aliphatic chain of from 4 to 30 carbon atoms, more particularly from 12 to 22 carbon atoms.

The recycled or renewable organic material typically comprises at least 50 wt % aliphatic compounds of the total weight of the recycled or renewable organic material.

Typically the recycled or renewable organic material refers to fats and/or oils of plant, microbial, algal, and/or animal origin. It also refers to any waste stream received from processing of such oils and/or fats. The recycled or renewable organic material may be in an unprocessed form (e.g. animal fat), or a processed form (used cooking oil).

Plant based fats and/or oils can originate directly from plants or they can be byproducts from various industrial sectors such as agriculture or forest industry. For example bio-oils and biocrudes can be produced from biomass, also known as lignocellulosic biomass, with various liquefying methods such as fast pyrolysis or hydrothermal liquefaction. Fast pyrolysis is the thermochemical decomposition of biomass through rapid heating in absence of oxygen. Hydrothermal liquefaction (HTL) is a thermal depolymerization process used to convert wet biomass into crude-like oil under moderate temperature and high pressure. Examples of bio-oil and biocrude produced from lignocellulosic biomass, e.g. materials like forest harvesting residues or byproducts of a saw mill, are lignocellulose pyrolysis liquid (LPL), which is produced via fast pyrolysis and HTL-biocrude, which is produced via hydrothermal liquefaction. Further example of plant based oil is tall oil, which is obtained as a by-product of the Kraft process of wood pulp manufacture as crude tall oil (CTO), and its derivates such as tall oil pitch (TOP), crude fatty acids (CFA), tall oil fatty acids (TOFA) and distilled tall oil (DTO). Tall oil comprises resin acids, fatty acids, and unsaponifiables. Resin acids are a mixture of organic acids derived from oxidation and polymerization reactions of terpenes. The main resin acid in tall oil is abietic acid but abietic derivatives and other acids such as primaric acid are also found. Fatty acids are long chain monocarboxylic acids and are found in hardwoods and softwoods. The main fatty acids in tall oil are oleic, linoleic and palmitic acids. Unsaponifiables cannot be turned into soaps as they are neutral compounds which do not react with sodium hydroxide to form salts. They include sterols, higher alcohols and hydrocarbons. Sterols are steroids derivatives which also include a hydroxyl group.

The term "tall oil pitch (TOP)" refers to residual bottom residual bottom fraction from tall oil distillation processes.

Tall oil pitch typically comprises from 34 to 51 wt % free acids, from 23 to 37 wt % esterified acids, and from 25 to 34 wt % unsaponifiable neutral compounds of the total weight of the tall oil pitch. The free acids are typically selected from a group consisting of dehydroabietic acid, abietic and other resin acids. The esterified acids are typically selected from a group consisting of oleic and linoleic acids. The unsaponifiables neutral compounds are typically selected from a group consisting of diterpene sterols, fatty alcohols, sterols, and dehydrated sterols.

The term "crude fatty acid (CFA)" refers to fatty acid-containing materials obtainable by purification (e.g., distillation under reduced pressure, extraction, and/or crystallization) of CTO.

The term "tall oil fatty acid (TOFA)" refers to fatty acid rich fraction of crude tall oil (CTO) distillation processes. TOFA typically comprises mainly fatty acids, typically at least 80 wt % of the total weight of the TOFA. Typically TOFA comprises less than 10 wt % rosin acids.

The term "distilled tall oil (DTO)" refers to resin acid rich fraction of crude tall oil (CTO) distillation processes. DTO typically comprises mainly fatty acids, typically from 55 to 90 wt %, and rosin acids, typically from 10 to 40 wt % rosin acids, of the total weight of the DTO. Typically DTO comprises less than 10 wt % unsaponifiable neutral compounds of the total weight of the distilled tall oil. The term "microbial oils" refers to triglycerides (lipids) produced by microbes. The term "algal oils" refers to oils derived directly from algae. The term "animal fats and oils" refers to lipid materials derived from animals.

Examples of the recycled or renewable organic material of the present invention include, but are not limited to, animal based oils and fats, vegetable or plant based oils and fats such as sludge palm oil, used cooking oil, microbial oils, algal oils, free fatty acids, any lipids containing phosphorous and/or metals, oils originating from yeast or mold products, oils originating from biomass, rapeseed oil, canola oil, colza oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria, tall oil, tall oil fatty acid TOFA), crude fatty acids (CFA), tall oil pitch (TOP), and any mixtures of said feedstocks.

In particular, the recycled or renewable organic material is crude tall oil (CTO) or tall oil pitch (TOP).

The recycled or renewable organic material to be treated by the present method contains high amounts of silicon compounds. The recycled or renewable organic material of the present invention comprises more than 1 ppm silicon compounds. In particular the recycled or renewable organic material of the present invention comprises more than 10 ppm silicon compounds, more particularly the recycled or renewable organic material of the present invention comprises more than 15 ppm silicon compounds, and even more particularly the recycled or renewable organic material of the present invention comprises more than 20 ppm silicon compounds.

The recycled or renewable organic material to be treated by the present method further contains high amounts of phosphorous compounds. The phosphorous compounds present in the biomass-based lipid material are typically phospholipids. The phospholipids present in the biomass-based lipid material are in particular one or more of phosphatidyl ethanolamines, phosphadityl cholines, phosphatidyl inositols, phosphatidic acids, and phosphatidyl ethanolamines.

In particular the recycled or renewable organic material of the present invention comprises more than 10 ppm, especially more than 20 ppm, particularly more than 50 ppm phosphorous.

The recycled or renewable organic material to be treated by the present method may also comprise further impurities e.g. impurities comprising phosphorus and/or metals in the form of phospholipids, soaps and/or salts. The impurities may for example be in the form of phosphates or sulfates, iron salts or organic salts, soaps or phospholipids. The metal impurities that may be present in the biomass-based lipid material are for example alkali metals or alkali earth metals, such as sodium or potassium salts, or magnesium or calcium salts, or any compounds of said metals.

Accordingly provided herein is method of purifying a recycled or renewable organic material, wherein the recycled or renewable organic material comprises more than 1 ppm silicon as silicon compounds and/or more than 10 ppm phosphorous as phosphorous compounds, comprising the steps of (a) providing a feed of the recycled or renewable organic material;

(b) optionally pre heat treating the recycled or renewable organic material at 180 to 325° C. and optionally adding acid before or after the heat treatment process and optionally filtering the pre heat treated recycled or renewable organic material;

(c) heat treating the recycled or renewable organic material in the presence of an adsorbent at 180 to 325° C. and filtering the heat treated recycled or renewable organic material, and optionally adding acid before or after the heat treatment process;

(d) optionally blending the heat treated recycled or renewable organic material with a hydrocarbon or lipid-based stream;

(e) optionally evaporating the volatile silicon compounds from the heat treated recycled or renewable organic material; and (f) hydrotreating the heat treated recycled or renewable organic material in a presence of a hydrotreating catalyst;

to obtain purified hydrotreated recycled or renewable organic material comprising less than 20%, preferably less than 10%, more preferably less than 5%, of the original silicon content of the recycled or renewable organic material provided in step (a) and/or less than 30% of the original phosphorous content of the recycled or renewable organic material provided in step (a).

In step (c) the recycled or renewable organic material is heated at any temperature from 180 to 325° C. For achieving optimal results, step (c) is performed at 200 to 300° C., preferably at 240 to 280° C.

The time during which the recycled or renewable organic material is heated and held at the desired temperature, i.e. residence time, is typically from 1 to 300 min, preferably from 5 to 240 min, more preferably from 30 to 90 min in step (c).

The pressure in step (c) is typically from 500 to 5000 kPa, preferably from 800 to 2000 kPa.

In step (c) the recycled or renewable organic material is heated to cause thermal reactions that disrupt the structure of the impurity containing compounds comprised in the recycled or renewable organic material thus forming material that adsorbs into the adsorbent present in the heating step (c), or material that forms solid precipitates and that can thus be subsequently removed from the recycled or renewable organic material.

The adsorbent present in step (c) may be selected from silica-based adsorbents. Preferably the adsorbent is selected from a group consisting of alumina silicate, silica gel and mixtures thereof. In step (c) the amount of adsorbent is typically from 0.1 to 10.0 wt-%, preferably 0.5 to 2.0 wt %, of the total weight of the treated recycled or renewable organic material.

The process can be further enhanced by acid addition before or after heat treatment in step (c). This removes any remaining sodium impurities. The acid is preferably selected from citric acid and phosphoric acid.

After the heat treatment the adsorbent comprising the undesired impurities is removed. Accordingly in step (c) the recycled or renewable organic material is subjected to removal of the solid adsorbent material. Removal of the solid material may be achieved for example by any separation method found suitable by a skilled person for separation of the solid material from the heat treated recycled or renewable organic material. Suitable examples include, but are not limited to, filtration, centrifugation, and phase separation. It is also to be understood that several separation methods, e.g. filtration and centrifugation, may be combined. The removal is preferably performed at any temperature from 100 to 180° C.

Prior to step (c) the recycled or renewable organic material may be subjected to a pre heat treatment in absence of adsorbent material. In optional step (b) the recycled or renewable organic material is pre heated to cause thermal reactions that disrupt silicon containing impurities comprised in the recycled or renewable organic material creating volatile silicon compounds material that can be subsequently removed from the h recycled or renewable organic material. In particular polydimethylsiloxanes (PDMS) resulting from anti-fouling agents degrade to volatile polydimethylcyclosiloxanes (PDMCS) under the process conditions.

The pre heat treatment of step (b) takes place at any temperature from 180 to 325° C. For achieving optimal results, step (b) is performed at 200 to 300° C., preferably at 240 to 280° C.

The time during which the recycled or renewable organic material is heated and held at the desired temperature, i.e. residence time, is typically from 1 to 300 min, preferably from 5 to 90 min, more preferably from 20 to 40 min in step (b).

The pressure in the pre heat treatment in step (b) is typically from 500 to 5000 kPa, preferably from 800 to 2000 kPa.

Optionally, the process can be further enhanced by acid addition before or after pre heat treatment in step (b). This removes any remaining sodium impurities. The acid is preferably selected from citric acid and phosphoric acid.

In step (b) the solid material created due to the heat treatment may be removed. Removal of the solid material may be achieved for example by any separation method found suitable by a skilled person for separation of the solid material from the heat treated recycled or renewable organic material. Suitable examples include, but are not limited to, filtration, centrifugation and phase separation. It is also to be understood that several separation methods, e.g. filtration and centrifugation, may be combined. Preferably the removal is accomplished by filtration. The removal is preferably performed at any temperature from 100 to 180° C.

Removal or solids/precipitates avoids deactivation of the hydrotreating catalyst in hydrotreatment of the recycled or renewable organic material.

After the heat treatment in step (c) the volatiles created due to the heat treatment and/or otherwise present in the recycled or renewable organic material may be removed. Accordingly in step (e) the heat treated recycled or renewable organic material is optionally subjected to evaporation of the volatile silicon compounds from the heat treated recycled or renewable organic material in one or more stages. In step (e) the evaporation is achieved at any temperature from 145 to 250° C., in particular at from 150° C. to 225° C. For achieving optimal results, the evaporation in step (e) is performed at from 160° C. to 200° C., preferably at from 160 to 180° C.

The reduced pressure in the evaporation in step (e) is such that evaporation of volatile Si compounds is achieved. Typically the pressure is from 0.1 to 5 kPa, preferably from 0.1 to 3 kPa.

The evaporated mass should advantageously be arranged to evaporation of 1 to 10 wt %, preferably from 1 to 8 wt %, more preferably from 1 to 5 wt %, even more preferably from 1 to 3 wt %, of the heat treated recycled or renewable organic material.

The time during which the heat treated recycled or renewable organic material is heated and evaporated at the desired temperature, i.e. residence time, is typically from 100 to 600 min, preferably from 180 to 300 min in the evaporation phase of step (e).

An applicable step (e) provides (i) a vapor fraction comprising the major part of volatile silicon compounds, and (ii) a heat treated recycled or renewable organic material fraction comprising less than 50%, preferably less than 30%, of the original silicon content of the recycled or renewable organic material provided in step (a).

The evaporation in step (e) may be accomplished by any evaporation method found suitable by a skilled person for separation of the volatiles from the heat treated recycled or renewable organic material. Suitable examples include, but are not limited to, falling film evaporation, rising film evaporation, thin film evaporation and flash evaporation, for example. The evaporation may be accomplished in one or more stages. It is also to be understood that several evaporation methods, e.g. thin film evaporation and flash evaporation, may be combined. Preferable evaporation method of the present invention is one or multi stage flash evaporation. Due to high pressure difference in flash vessel, less evaporation mass is needed in flash evaporation to provide better mass transfer as compared to thin film evaporation. For example, applying the same method and equipment as in a typical crude tall oil (CTO) thin film evaporation process for tall oil pitch (TOP) after heat treatment remarkably increases heat consumption as compared to flash evaporation.

The optimum temperature, pressure, evaporated mass and how many flash stages to use depends on composition and quality of the recycled or renewable organic material and also on the heat treatment parameters (temperature, pressure and residence time) of step (c) and optional steps (b) and (e).

Furthermore, it is preferable to add water to the initial mixture of the heat treated recycled or renewable organic material. Adding a small percentage of water to the initial heat treated recycled or renewable organic material allows use of lower temperature and higher vacuum pressure while achieving the same level of Si removal than in normal evaporation. Even more importantly, there is less loss of volatile fatty acids, which reduces the amount of fatty acid waste to half compared to evaporation without water.

Accordingly in an example of the present invention water is added to the heat treated recycled or renewable organic material so that water content before evaporation step (e) is from 1 to 5 wt %, preferably from 1.5 to 4 wt % more preferably from 2 to 3 wt % of the total weight of the heat treated recycled or renewable organic material.

The purified recycled or renewable organic material is subjected to (f) to hydrotreatment in presence of a hydrotreating catalyst to further remove silicon from the recycled or renewable organic material.

The heat treated recycled or renewable organic material may be (d) blended with a hydrocarbon or lipid-based stream if so desired. The hydrocarbon or lipid-based stream is preferably vacuum gas oil (VGO).

The term "hydrotreating" refers to a chemical engineer process in which reaction of hydrogen is used to remove impurities, such as oxygen, sulfur, nitrogen, phosphorous, silicon and metals, especially as part of oil refining.

Hydrotreating can be performed in one or several steps in one or more reactor units or catalyst beds.

Step (f) is typically achieved under continuous hydrogen flow. For achieving optimal results the continuous hydrogen flow is step (f) preferably has H2/feed ratio from 500 to 2000 n-L/L, more preferably from 800 to 1400 n-L/L.

In step (f) hydrotreatment is advantageously performed at a temperature from 270 to 380° C., preferably from 275 to 360° C., more preferably from 300 to 350° C. Typically the pressure in step (f) is from 4 to 20 MPa.

The hydrotreating catalyst is step (f) preferably comprises at least one component selected from IUPAC group 6, 8 or 10 of the Periodic Table. Preferably the hydrotreating catalyst in step (f) is a supported Pd, Pt, Ni, NiW, NiMo or a CoMo catalysts and the support is zeolite, zeolite-alumina, alumina and/or silica, preferably NiW/Al$_2$O$_3$, NiMo/Al$_2$O$_3$ or CoMo/Al$_2$O$_3$. In particular the hydrotreating catalyst is a sulfided NiW, NiMO or CoMo catalyst.

The time during which the recycled or renewable organic material is heated and held at the desired temperature, i.e. residence time, is typically from 1 to 300 min, preferably from 5 to 240 min, more preferably from 30 to 90 min in step (c).

An applicable hydrotreatment step (f) provides a purified hydrotreated recycled or renewable organic material. The purified hydrotreated recycled or renewable organic material advantageously comprises less than 20%, more preferably less than 10%, even more preferably less than 5%, of the original silicon content content of the recycled or renewable organic material provided in step (a) and/or less than 30% of the original phosphorous content of the recycled or renewable organic material provided in step (a).

For achieving optimal results part of the hydrotreated recycled or renewable organic material may be recycled in step (f). Preferably the ratio of the fresh feed i.e. purified recycled or renewable organic material obtained in step (c) to the recycled hydrotreated recycled or renewable organic material is from 2:1 to 20:1.

In a particular example step (f) is accomplished by (f1) hydrodeoxygenating (HDO) the heat treated recycled or renewable organic material fraction. This is preferably achieved in a presence of a HDO catalyst at a temperature from 290 to 350° C. under pressure from 4 to 20 MPa and under continuous hydrogen flow.

The term "hydrodeoxygenation (HDO)" refers to removal of oxygen as water by the means of molecular hydrogen under the influence of a (HDO) catalyst.

The HDO catalyst may for example be selected from a group consisting of NiMO-, CoMo-, NiW-catalysts and any mixtures thereof. Preferably the HDO catalyst is sulfided NiW, NiMo or CoMo catalyst.

Advantageously, the continuous hydrogen flow has H2/feed ratio from 500 to 2000 n-L/L, preferably from 800 to 1400 n-L/L.

Preferably step (f1) is performed to obtain purified recycled or renewable organic material comprising less than 1 wt % oxygen.

In another example step (f) is accomplished by (f2) hydrodesulfurizing (HSD) the heat treated recycled or renewable organic material fraction. The term "hydrodesulfurisation (HDS)" refers to removal of sulfur as hydrogensulfide by the means of molecular hydrogen under the influence of a (HDS) catalyst.

In another example step (f) is accomplished by (f3) hydrometaillizing (HDM) the heat treated recycled or renewable organic material fraction. The term "hydrodemetallization (HDM)" refers to removal of metals by trapping them with a (HDM) catalyst.

In another example step (f) is accomplished by (f4) hydrodenitrificating (HDN) the heat treated recycled or renewable organic material fraction. The term "hydrodenitrification (HDN)" refers to removal of nitrogen by the means of molecular hydrogen under the influence of a (HDN) catalyst.

In another example step (f) is accomplished by (f5) hydrodearomatizing (HDA) the heat treated recycled or renewable organic material fraction. The term "hydrodearomatisation (HDA)" refers to saturation or ring opening of aromatics by the means of molecular hydrogen under the influence of a (HDA) catalyst.

FIG. 1 illustrates a first exemplary process flow of the present method.

Referring to FIG. 1, a feed of recycled or renewable organic material, in particular tall oil pitch (TOP), 10 is subjected to a step of heat treating 20 the recycled or renewable organic material as discussed herein for step (b). The heat treated feed of recycled or renewable organic material may then be then evaporated 30 as discussed herein for step (e) and a bottom containing a heat treated recycled or renewable organic material fraction 31 comprising less than 50% of the original silicon content of the recycled or renewable organic material provided in step (a), and a vapor fraction 32 comprising the major part of volatile silicon compounds is obtained. The heat treated recycled organic material 31 is then subjected to heating 40 the recycled or renewable organic material the presence of adsorbent to adsorb the impurities to the adsorbent and to render the mixture separable as discussed herein for step (c). The adsorbent is then separated 50 from the treated feed of recycled or renewable organic material as discussed herein for step (c) to obtain a purified recycled or renewable organic material 51 and an adsorbent 52 comprising the major part of the impurities. The purified recycled or renewable organic material is then hydrotreated 60, as discussed herein for step (f) to obtain a purified hydrotreated recycled or renewable organs is material 61, wherein the purified hydrotreated recycled or renewable organic material comprises less than 20%, preferably less than 10%, more preferably less than 5%, of the original silicon content of the recycled or renewable organic material provided in step (a) and/or less than 30% of the original phosphorous content of the recycled or renewable organic material provided in step (a). The hydrotreated recycled or renewable organic material 61 may then be subjected to catalytic upgrading 70.

After the recycled or renewable organic material has been purified in accordance with the present method, it may be subjected to further processing e.g. catalytic upgrading. Such catalytic upgrading processes include, but are not limited to, catalytic cracking, catalytic hydrocracking, thermo-catalytic cracking, catalytic hydrotreatment, fluid catalytic cracking, catalytic ketonization, and catalytic esterification. Such processes require the recycled or renewable organic material to be sufficiently pure and free from impurities that may otherwise hamper the catalytic process or poison the catalyst(s) present in the process.

Accordingly the present invention further provides a process for producing recycled or renewable hydrocarbons, comprising steps of (x) purifying the recycled or renewable organic material as discussed herein, and (y) subjecting the purified recycled or renewable organic material to an oil refinery conversion process, wherein the oil refinery conversion process comprises altering the molecular weight of the feed, such hydrocracking, or steamcracking, removal of heteroatoms from the feed, such as thermal catalytic cracking, fluid catalytic cracking, or hydrotreating, in particular hydrodeoxygenating, or hydrodesulfurizing, altering the degree of saturation of the feed, such as hydrotreating, thermal catalytic cracking, or fluid catalytic cracking, rearranging the molecular structure of the feed, such as isomerizing, or any combination thereof to obtain at least one recycled or renewable hydrocarbon.

In a typical example of the present process the recycled or renewable hydrocarbon is a renewable traffic fuel or fuel component.

In an example of the present process, step (y) is hydrocracking. In such example, step (y) is preferably performed in a mild hydrocracking (MHC) refinery unit, in particular in a presence of a hydrocracking catalyst.

In another example of the present process, step (y) is steamcracking. In such example step (y) is preferably performed in a steamcracking unit.

In yet another example of the present process, step (y) is isomerization. In such example, step (y) is preferably performed in an isomerization unit.

In yet another example of the present process, step (y) is hydrotreating. In such example, step (y) is preferably performed in a hydrotreating unit.

In yet another example of the present process, step (y) is thermal catalytic cracking (TCC). In such example, step (y) is preferably performed in a thermal catalytic cracking unit.

In yet another example of the present process, step (y) is fluid catalytic cracking (FCC). In such example, step (y) is preferably performed in a fluid catalytic cracking unit.

EXPERIMENTAL

Example 1

Crude TOP was treated in the presence of two adsorbents: alumina silicate (Tonsil 9194 FF) and silica gel (Trisyl). The amount of each adsorbent was 1.5 wt-%. Crude TOP samples from different producers were tested. Water addition of 0.4 wt-% was made prior the high temperature adsorption treatment.

During high temperature adsorption treatment the sample materials were heated to temperature 280° C. for 60 minutes. After this treatment the sample materials were cooled to 100° C. and filtered through a 0.45 µm filter paper.

Figure 2:
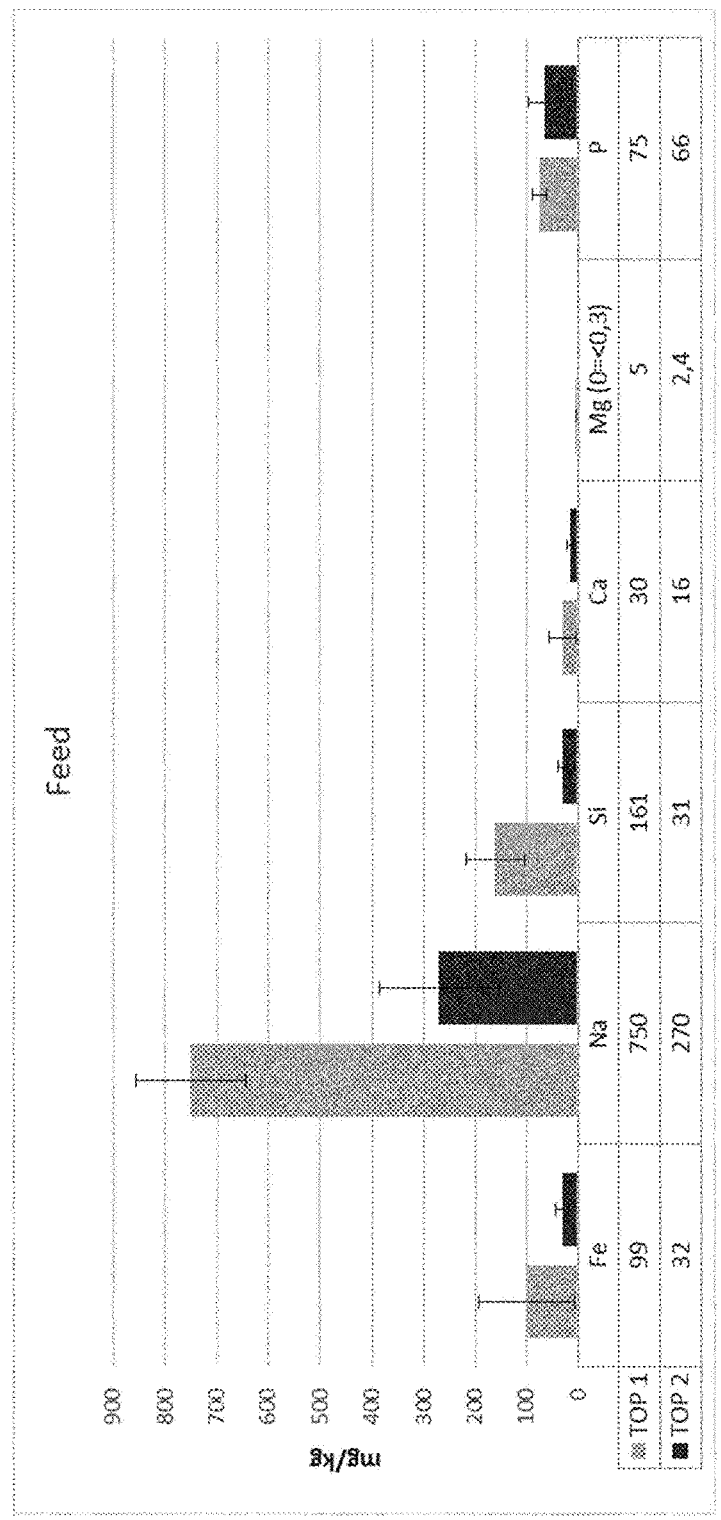
FIG. 2 illustrates effect of acid treatment on Si and P removal from crude TOP samples.
Figure 3:
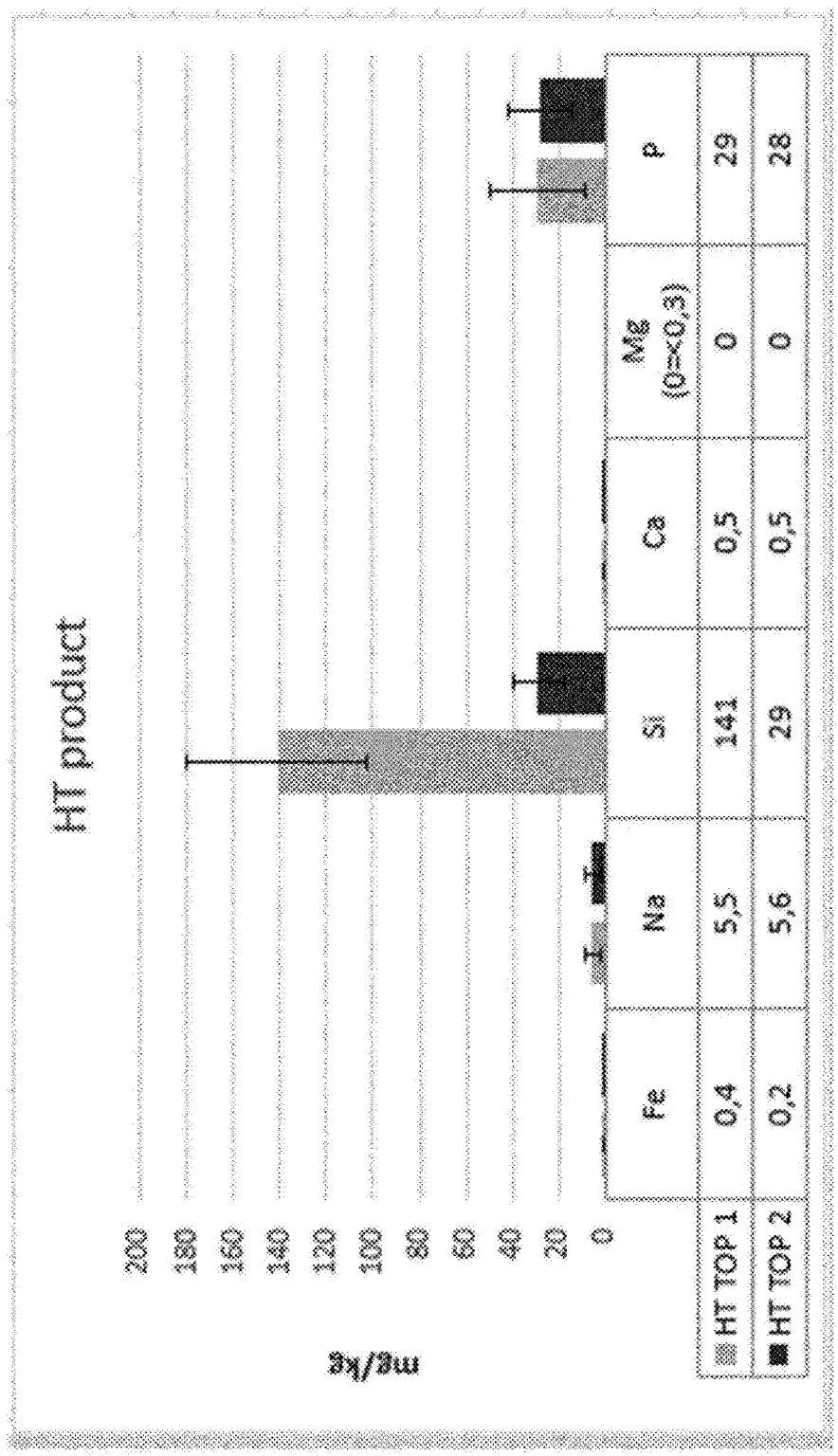
FIG. 3 illustrates effect of heat treatment on Si and P removal from crude TOP samples.

From the obtained results it can be seen that Si and other impurities can be very efficiently removed from the feed at elevated temperatures in presence of both alumina silicate and silica gel adsorbent. However, more efficient purification was obtained using silica gel material. The results are listed in Table 1. As can be seen from Table 2 and FIG. 2 and FIG. 3, efficient Si and P removal cannot be achieved by mere acid+heat treatment nor acid+adsorption purification method.

TABLE 1

Effect of heat treatment adsorption on Si and P removal from different types of crude TOP samples. Adsorbent addition 1.5 wt-%.

| | | 14144865<br>Crude TOP A | 14225369<br>280° C., 1 hour<br>1.5 wt.-% Tonsil 9194 | 14225368<br>280° C., 1 hour<br>1.5 wt.-% Trisyl |
|---|---|---|---|---|
| Al | mg/kg | 7.1 | 3.7 | <0.2 |
| Fe | mg/kg | 27 | 32 | 2.4 |
| Na | mg/kg | 580 | 150 | 150 |
| Si | mg/kg | 27 | 3 | 1.3 |
| Ca | mg/kg | 56 | 13 | 0.82 |
| Mg | mg/kg | 6.2 | 14 | <0.3 |
| P | mg/kg | 50 | 14 | <0.6 |

| | | 14177357<br>Crude TOP B | 14225371<br>280° C., 1 hour<br>1.5 wt.-% Tonsil 9194 | 14225370<br>280° C.<br>1.5 wt.-% Trisyl |
|---|---|---|---|---|
| Al | mg/kg | 10 | 4 | <0.2 |
| Fe | mg/kg | 71 | 50 | 0.62 |
| Na | mg/kg | 740 | 180 | 170 |
| Si | mg/kg | 130 | 12 | 4.4 |
| Ca | mg/kg | 41 | 13 | 0.57 |
| Mg | mg/kg | 7.4 | 13 | <0.3 |
| P | mg/kg | 137 | 21 | 1.3 |

TABLE 2

Effect of acid treatment (Citric acid addition 2000 ppm) and adsorption on Si and P removal from crude TOP sample. Adsorbent addition 2.0 wt-%.

| | | 14151662<br>Crude TOP C | 14151646<br>120° C. bleaching + cake filtration<br>2 wt.-% Tonsil 9194 |
|---|---|---|---|
| Al | mg/kg | 5 | 0.64 |
| Fe | mg/kg | 29 | 1.1 |
| Na | mg/kg | 490 | 6.9 |
| Si | mg/kg | 41 | 15 |
| Ca | mg/kg | 25 | 4.5 |
| Mg | mg/kg | 4.2 | 1.5 |
| P | mg/kg | 73 | 9.5 |

It will be obvious to a person skilled in the art that, as the technology advances, the inventive concept can be implemented in various ways. The invention and its embodiments are not limited to the examples described above but may vary within the scope of the claims.

The invention claimed is:

1. A method of purifying a recycled or renewable organic material, having more than 1 ppm silicon as silicon compounds and/or more than 10 ppm phosphorous as phosphorous compounds, the method comprising:
   (a) providing a feed of the recycled or renewable organic material, wherein the recycled or renewable organic material is selected from a group consisting of plant based fats and oils, animal based fats and oils, fossil waste-based oils, waste oils, algal oils and microbial oils;
   (b) optionally pre heat treating the recycled or renewable organic material at 180 to 325° C. and optionally adding acid before or after the heat treatment process and optionally filtering the pre heat treated recycled or renewable organic material;

(c) heat treating the recycled or renewable organic material in a presence of an adsorbent selected from silica-based adsorbents at 180 to 325° C. and filtering the heat treated recycled or renewable organic material, and optionally adding acid before or after the heat treatment process;

(d) optionally blending the heat treated recycled or renewable organic material with a hydrocarbon or lipid-based stream;

(e) optionally evaporating the volatile silicon compounds from the heat treated recycled or renewable organic material; and (f) hydrotreating the heat treated recycled or renewable organic material in a presence of a hydrotreating catalyst;

to obtain purified hydrotreated recycled or renewable organic material selected to contain at least one or more of less than 20%, or less than 10%, or less than 5%, of the original silicon content of the recycled or renewable organic material provided in step (a) and/or less than 30% of the original phosphorous content of the recycled or renewable organic material provided in step (a).

2. A method as claimed in claim 1, wherein the recycled or renewable organic material comprising:
(b) preheat treating at 180 to 325° C. to form a heat treated recycled or renewable organic material.

3. A method as claimed in claim 2, comprising:
performing heat treatment in step (b) at a temperature range selected to be one or more of from 200 to 300° C., or from 240 to 280° C.

4. A method as claimed in claim 3, wherein the residence time is selected to be within one or more ranges of from 1 to 300 min, or from 5 to 90 min, or from 20 to 40 min in heat treatment of step (b).

5. A method as claimed in claim 4, wherein evaporation in step (e) is selected to be within one or more ranges of at 150° C. to 225° C., or at 160° C. to 200° C., or at 160 to 180° C.

6. A method as claimed in claim 5, wherein a pressure in evaporation of step (e) is selected to be within one or more ranges of from 0.1 to 5 kPa, or from 0.1 to 3 kPa.

7. A method as claimed in claim 6, wherein in evaporation of step (e) 1 to 10 wt %, or from 1 to 8 wt %, or from 1 to 5 wt %, or from 1 to 3 wt %, of the heat treated recycled or renewable organic material is evaporated.

8. A method as claimed in claim 7, wherein water is added to the heat treated recycled or renewable organic material so that the water content of the heat treated recycled or renewable organic material before evaporation step (e) selected to be within one or more ranges of from 1 to 5 wt %, or from 1.5 to 4 wt %, or from 2 to 3 wt %.

9. A method as claimed in claim 8, wherein the temperature in step (c) is selected to be within one or more ranges of from 200 to 300° C., or from 240 to 280° C.

10. A method as claimed in claim 9, wherein a residence time is selected to be within one or more ranges of from 1 to 300 min, or from 5 to 240 min, or from 30 to 90 min in step (c).

11. A method as claimed in claim 10, wherein a pressure in step (c) is from 500 to 5000 kPa, or from 800 to 2000 kPa.

12. A method as claimed in claim 11, wherein the silica-based adsorbent is selected from a group consisting of alumina silicate, silica gel and mixtures thereof.

13. A method as claimed in claim 12, wherein an amount of adsorbent is from 0.1 to 10.0 wt-%, or 0.5 to 2.0 wt %, of a total weight of the treated recycled or renewable organic material.

14. A method as claimed in claim 13, wherein acid is added before or after heat treatment in step (c).

15. A method as claimed in claim 14, wherein hydrotreating step (f) takes place under continuous hydrogen flow.

16. A method as claimed in claim 15, wherein in step (f) the continuous hydrogen flow has an H2/feed ratio selected to be within one or more ranges of from 500 to 2000 n-L/L, or from 800 to 1400 n-L/L.

17. A method as claimed in claim 16, wherein step (f) is performed at a temperature selected to be within one or more ranges of from 270 to 380° C., or from 275-360° C., or from 300-350° C.

18. A method as claimed in claim 17, wherein step (f) is performed under pressure from 4 to 20 MPa.

19. A method as claimed in claim 18, wherein the hydrotreating catalyst in step (f) comprises at least one component selected from IUPAC group 6, 8 or 10 of the Periodic Table.

20. A method as claimed in claim 19, wherein the hydrotreating catalyst in step (f) is a supported Pd, Pt, Ni, NiW, NiMo or a CoMo catalysts and the support is zeolite, zeolite-alumina, alumina and/or silica, $NiW/Al_2O_3$, $NiMo/Al_2O_3$ or $CoMo/Al_2O_3$.

21. A method as claimed in claim 20, wherein step (f) is accomplished by (f1) hydrodeoxygenating (HDO) the heat treated recycled or renewable organic material fraction.

22. A method as claimed in claim 21, wherein step (f) is accomplished by (f1) hydrodeoxygenating (HDO) the heat treated recycled or renewable organic material fraction in a presence of a HDO catalyst at a temperature from 290 to 350° C. under pressure from 4 to 20 MPa and under continuous hydrogen flow to obtain purified recycled or renewable organic material selected to contain at least one or more of less than 20%, or less than 10%, or less than 5%, of the original silicon content of the recycled or renewable organic material provided in step (a).

23. A method as claimed in claim 22, wherein in step (f1) the HDO catalyst is sulfided NiW, NiMO or CoMo catalyst.

24. A method as claimed in claim 23, wherein in step (f1) the continuous hydrogen flow has an H2/feed ratio from 500 to 2000 n-L/L, or from 800 to 1400 n-L/L.

25. A method as claimed in claim 24, wherein a part of the hydrotreated product is recycled in step (f).

26. A method as claimed in claim 25, wherein a ratio of the fresh feed to the hydrotreated product is from 2:1 to 20:1.

27. A method as claimed in claim 26, wherein in step (d) the hydrocarbon or lipid-based stream is vacuum gas oil (VGO) or animal fat.

28. A process for producing recycled or renewable hydrocarbons, comprising:
(x) purifying the recycled or renewable organic material as claimed in claim 1; and
(y) subjecting the purified recycled or renewable organic material to an oil refinery conversion process, wherein the oil refinery conversion process includes altering a molecular weight of the feed, removal of heteroatoms from the feed, altering a degree of saturation of the feed, rearranging the molecular structure of the feed, or any combination thereof to obtain at least one recycled or renewable hydrocarbon.

29. A process as claimed in claim 28, wherein step (y) is hydrocracking.

30. A process as claimed in claim 28, wherein step (y) is performed in a mild hydrocracking (MHC) refinery unit.

31. A process as claimed in claim 29, wherein step (y) is performed in a presence of a hydrocracking catalyst.

32. A process as claimed in claim 28, wherein step (y) is steamcracking.

33. A process as claimed in claim 28, wherein step (y) is isomerization.

34. A process as claimed in claim 28, wherein step (y) is hydrotreating.

35. A process as claimed in claim 28, wherein step (y) is thermal catalytic cracking.

36. A process as claimed in claim 28, wherein step (y) is fluid catalytic cracking.

\* \* \* \* \*